US012650312B2

(12) United States Patent
Li et al.

(10) Patent No.: US 12,650,312 B2
(45) Date of Patent: Jun. 9, 2026

(54) PARKING MANAGEMENT AND NAVIGATION

(71) Applicant: Beken Corporation, Shanghai (CN)

(72) Inventors: Jie Li, Shanghai (CN); Weifeng Wang, Shanghai (CN)

(73) Assignee: Beken Corporation, Shanghai (CN)

( * ) Notice: Subject to any disclaimer, the term of this patent is extended or adjusted under 35 U.S.C. 154(b) by 295 days.

(21) Appl. No.: 18/181,329

(22) Filed: Mar. 9, 2023

(65) Prior Publication Data

US 2024/0255296 A1    Aug. 1, 2024

(30) Foreign Application Priority Data

Jan. 31, 2023    (CN) ........................ 202310094519.X

(51) Int. Cl.
 *G08G 1/14* (2006.01)
 *G01C 21/34* (2006.01)
(52) U.S. Cl.
 CPC ......... G01C 21/3476 (2013.01); G08G 1/141 (2013.01); G08G 1/142 (2013.01); G08G 1/143 (2013.01); G08G 1/144 (2013.01); G08G 1/145 (2013.01); G08G 1/146 (2013.01); *G08G 1/147* (2013.01)
(58) Field of Classification Search
 CPC ........ G08G 1/141; G08G 1/144; G08G 1/143; G08G 1/142; G08G 1/148; G08G 1/145; G08G 1/146; G08G 1/147; G08G 1/0968; G08G 1/14; G05D 1/0212; G01C 21/3685; G01C 21/3476; B60W 30/06; B62D 15/0285; B62D 15/028; G07B 15/02
 See application file for complete search history.

(56) References Cited

U.S. PATENT DOCUMENTS

| | | | | |
|---|---|---|---|---|
| 9,711,047 B1* | 7/2017 | Knas | ....................... | G08G 1/143 |
| 2012/0092189 A1* | 4/2012 | Jordan | ................... | G08G 1/146 |
| | | | | 340/932.2 |
| 2013/0166333 A1* | 6/2013 | Chang | ................... | G08G 1/144 |
| | | | | 705/5 |
| 2016/0379495 A1* | 12/2016 | Engelen | ................ | G08G 1/143 |
| | | | | 340/932.2 |
| 2017/0148324 A1* | 5/2017 | High | ....................... | G08G 1/144 |
| 2019/0063947 A1* | 2/2019 | Beaurepaire | ....... | G01C 21/3423 |
| 2022/0067392 A1* | 3/2022 | Gliesman | ............... | G08G 1/146 |
| 2023/0023365 A1* | 1/2023 | Nguyen | ............ | B62D 15/0285 |
| 2025/0037225 A1* | 1/2025 | Ohmori | .................... | G08G 1/14 |

FOREIGN PATENT DOCUMENTS

| | | | | |
|---|---|---|---|---|
| CN | 108717801 A | * 10/2018 | ............. | G08G 1/144 |
| CN | 111754801 A | * 10/2020 | ........... | G08G 1/0968 |

* cited by examiner

*Primary Examiner* — Khoi H Tran
*Assistant Examiner* — Tanner L Cullen
(74) *Attorney, Agent, or Firm* — Schwegman Lundberg & Woessner, P.A.

(57) ABSTRACT

Methods, systems, and computer programs are presented for parking management and navigation. One method includes operations for determining an availability of a parking space having a parking space ID, obtaining a radio-frequency ID associated with a vehicle occupying the parking space, and communicating the parking space ID and the radio-frequency ID to a storage device via a self-organized network formed by multiple parking space terminals. Further, the method includes operations for providing navigation to a vacant parking space and providing navigation to a parked vehicle.

15 Claims, 9 Drawing Sheets

| Parking Space ID | RFID | Availability | Characteristic |
|---|---|---|---|
| 0001 | 1199389928544640 | Occupied | Near-Entrance |
| 0002 | 1199389589334230 | Occupied | null |
| 0003 | null | Vacant | null |
| ...... | | | |
| 0007 | null | Vacant | Near-Elevator |
| 0008 | null | Vacant | Near-Elevator |
| ...... | | | |
| 0010 | null | Vacant | Near-mall-entrance |
| 0011 | null | Vacant | Near-mall-entrance |
| 0012 | null | Vacant | spacious, near entrance |

DETERMINE A FIRST AVAILABILITY OF A FIRST PARKING SPACE, THE FIRST PARKING SPACE HAVING A FIRST PARKING SPACE ID, THE FIRST AVAILABILITY OF THE FIRST PARKING SPACES BEING EITHER VACANT OR OCCUPIED, THE FIRST PARKING SPACE BEING ONE OF A PLURALITY OF PARKING SPACES <u>602</u>

OBTAIN A FIRST RFID ASSOCIATED WITH A FIRST VEHICLE AND A FIRST USER DEVICE IN RESPONSE TO DETERMINING THAT THE FIRST PARKING SPACE BEING OCCUPIED BY THE FIRST VEHICLE <u>604</u>

RE-DETERMINE THE FIRST AVAILABILITY OF THE FIRST PARKING SPACE WITHIN A PRE-SPECIFIED LENGTH OF TIME TO CONFIRM THAT THE FIRST PARKING SPACE IS STILL BEING OCCUPIED BY THE FIRST VEHICLE <u>606</u>

COMMUNICATE THE FIRST RFID AND THE FIRST PARKING SPACE ID TO A STORAGE DEVICE VIA A SELF-ORGANIZED NETWORK FORMED BY A PLURALITY OF PARKING SPACE TERMINALS <u>608</u>

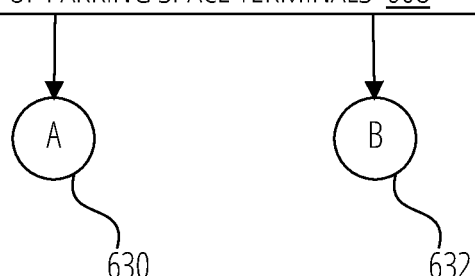

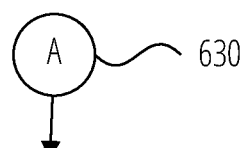

OBTAIN A SECOND RFID ASSOCIATED WITH A SECOND VEHICLE IN RESPONSE TO DETERMINING THAT THE SECOND VEHICLE HAVING ENTERED A PARKING LOT 612

PROVIDE A SECOND USER DEVICE WITH NAVIGATION INSTRUCTIONS TO A VACANT PARKING SPACE, WHEREIN THE VACANT PARKING SPACE BEING ONE OF THE PLURALITY OF PARKING SPACES 614

GENERATE A FIND-PARKING ROUTE STARTING FROM A STARTING LOCATION OF THE SECOND USER DEVICE TO THE VACANT PARKING SPACE 616

IDENTIFY LOCATIONS OF THE SECOND USER DEVICE AS THE SECOND USER DEVICE MOVES BASED ON AT LEAST TWO DISTANCES BETWEEN THE SECOND USER DEVICE AND EACH OF AT LEAST TWO PARKING SPACE TERMINALS 618

PROVIDE THE SECOND USER DEVICE WITH TURN-BY-TURN NAVIGATION INSTRUCTIONS BASED ON THE FIND-PARKING ROUTE AND THE IDENTIFIED LOCATIONS OF THE SECOND USER DEVICE 620

FIG. 6B

IDENTIFY THE FIRST PARKING SPACE BASED ON AN ASSOCIATION BETWEEN THE FIRST RFID AND THE FIRST PARKING SPACE ID <u>622</u>

GENERATE A FIND-CAR ROUTE STARTING FROM A STARTING LOCATION OF THE FIRST USER-DEVICE TO THE FIRST PARKING SPACE <u>624</u>

IDENTIFY LOCATIONS OF THE FIRST USER DEVICE AS THE FIRST DEVICE MOVES BASED ON THE DISTANCES AMONG THE FIRST USER DEVICE AND AT LEAST TWO PARKING SPACE TERMINALS <u>626</u>

PROVIDE THE FIRST USER DEVICE WITH TURN-BY-TURN NAVIGATION INSTRUCTIONS BASED ON THE FIND-CAR ROUTE AND THE IDENTIFIED LOCATIONS OF THE FIRST USER DEVICE <u>628</u>

FIG. 6C

PARKING MANAGEMENT AND NAVIGATION

CROSS REFERENCE TO RELATED APPLICATION

This application claims priority to and incorporates by reference Chinese patent application no. 202310094519.X filed 31 Jan. 2023.

TECHNICAL FIELD

The present disclosure relates to parking management systems and more particularly, but not exclusively to a system and method for identifying available parking spaces and providing navigation to same.

BACKGROUND

With the rapid development of internet technology, intelligent terminals have become indispensable tools for communication, entertainment, life, and socialization in people's daily life. Under the background of "Internet Plus," the number of motor vehicles is growing rapidly. In large parking lots, such as parking lots of shopping malls and shopping centers, finding a parking space and finding a parked vehicle are two difficult problems that vehicle owners face. On the one hand, parking spaces in many popular areas are insufficient, and vehicle owners need to drive around looking for parking spaces in the parking lot. On the other hand, due to the parking lot's large space, similar environment and signs, and difficulty in finding directions, vehicle owners in the parking lot are easily disoriented and unable to find their own vehicles. Also, outdoor satellite navigation cannot be used to find destinations in indoor parking lots.

BRIEF SUMMARY

The present disclosure involves a parking management method, system, and computer programs. One general aspect includes a method that includes operations for determining a first availability of a first parking space, the first parking space having a first parking space ID, the first availability of the first parking spaces being either vacant or occupied, the first parking space being one of a plurality of parking spaces; obtaining a first radio-frequency ID (RFID) associated with a first vehicle and a first user device in response to determining that the first parking space being occupied by the first vehicle; re-determining the first availability of the first parking space within a pre-specified length of time to confirm that the first parking space is still being occupied by the first vehicle; and communicating the first RFID and the first parking space ID to a storage device via a self-organized network formed by a plurality of parking space terminals.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates an exemplary data structure used by a storage device of the parking management system in accordance some embodiments.

FIGS. 6A-6C include a flowchart representing a method 600 for parking-management in accordance with some embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
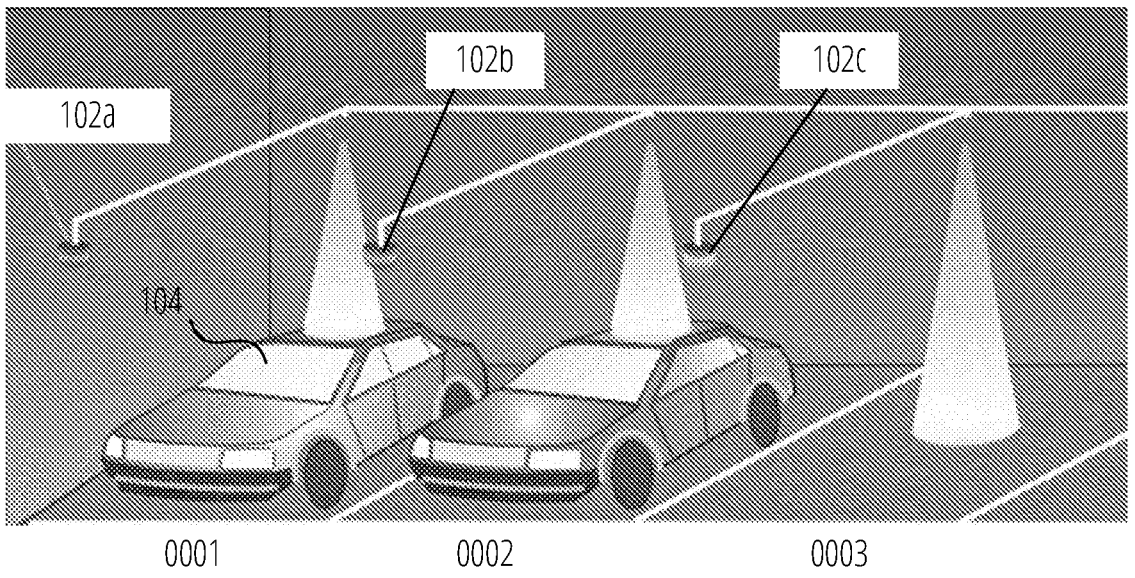
FIG. 1 illustrates an exemplary parking space terminal of the parking-management system in accordance with some embodiments.

FIG. 1 illustrates an exemplary parking-management system implemented in accordance with some embodiments. In one embodiment, the parking-management system is implemented in a parking lot. The parking lot comprises a plurality of parking spaces. Each of the plurality of parking spaces has a unique parking space ID to distinguish itself with the other parking spaces. In one embodiment, a parking space ID may be one or more numbers, characters, letters, symbols, or combination thereof. In the embodiment illustrated in FIG. 1, the three parking spaces from left to right each having parking spaces ID: 0001, 0002, and 0003. In another embodiment, the parking-management system is implemented in a network of parking spaces. The network includes a plurality of parking spaces. The parking spaces in the network are properties of different entities and are scattered around an area (e.g., a city, a neighborhood, etc.) Each of the parking spaces in the network has a unique parking space ID. Hereinafter, for simplicity, a parking space may be referred to as "parking space" followed by its parking space ID. For example, the parking space with parking space ID 0001 may be referred to as parking space 0001.

In FIG. 1, the exemplary parking-management system includes one or more parking space terminals 102a, 102b, 102c, etc. Each parking space terminals 102a-c corresponds, respectively, to a parking space. In the embodiment shown in FIG. 1. The parking space terminal 102a is installed at the parking space 0001, the parking space terminal 102b is installed at parking space 0002, and the parking space terminal 102c is installed at parking space 0003.

Figure 3:
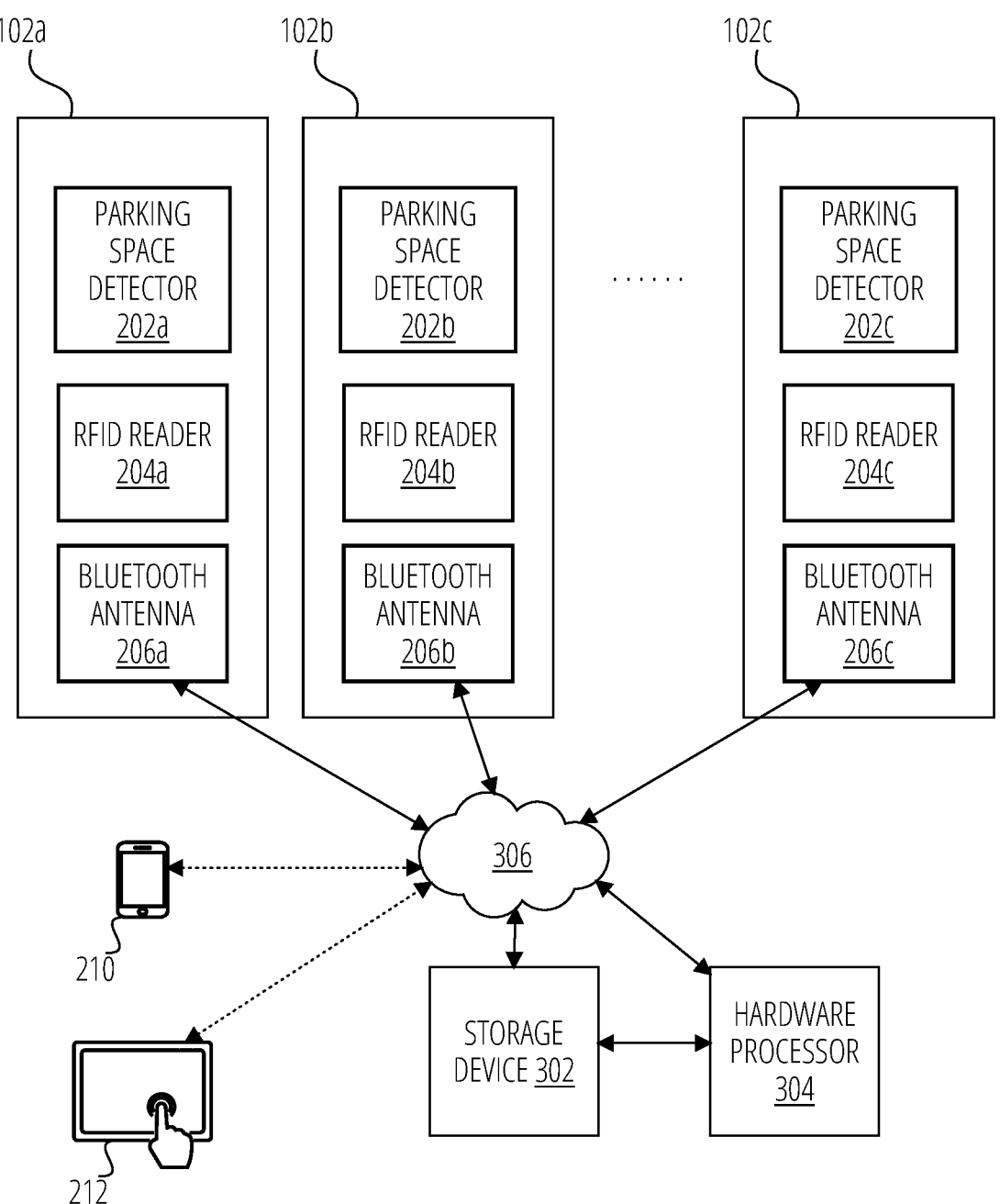
FIG. 3 illustrates an exemplary (and simplified) parking-management system in accordance with some embodiments.

Each parking space has an availability of the parking space, indicating whether the parking space is occupied or vacant. The availability of a parking space is occupied if there is a vehicle presently parked in the parking space. The availability of a parking space is vacant if no vehicle is presently parked in the parking space. As shown in FIG. 1, the availabilities of parking space 0001 and parking space 0002 are occupied, and the availability of parking space 0003 is vacant. Parking Space IDs are stored in the storage device 302 (FIG. 3). In one embodiment, each of the parking space terminals 102a-c comprises an indicator light indicating the availability of a parking space. The indicator light displays a green light when the availability of a parking space is vacant and displays a red light when the availability of the parking space is occupied.

The parking space terminals 102a-c are configured to determine the availability of a parking space and obtain a radio-frequency ID (RFID) associated with a vehicle and a user device (see below).

Figure 2:
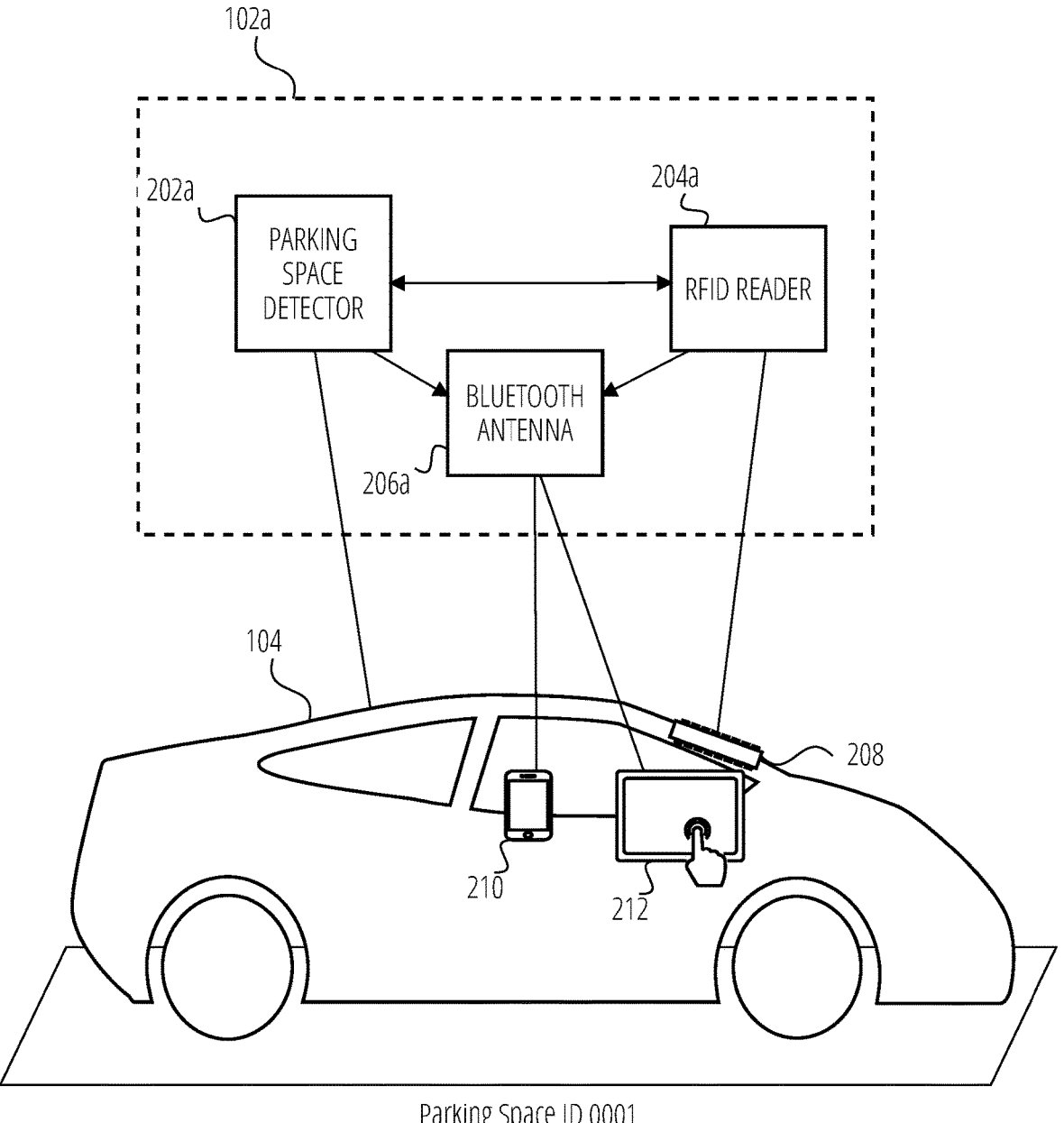
FIG. 2 illustrates an exemplary parking space terminal of the parking-management system in operation in accordance with some embodiments.

FIG. 2 illustrates an exemplary parking space terminal of the parking-management system in operation in accordance with some embodiments. For illustration purposes, one of the parking space terminal, 102a, is shown. Other parking space terminals (e.g., parking space terminal 102b and parking space terminal 102c as illustrated in FIG. 1) work in substantially the same way as parking space terminal 102a. The parking space terminal 102a comprises a parking space detector 202a, an RFID reader 204a, and a Bluetooth antenna 206a. FIG. 2 also illustrates a first vehicle 104 (e.g., a car, a truck, a motorcycle) occupying the parking space 0001. The parking space terminal 102a corresponds to the parking space 0001. The first vehicle 104 comprises a user device 210, a first in-car device 212, and an RFID tag 208. The first user device 210 corresponds to the driver or operator of the first vehicle 104. The first in-car device 212 is installed inside the first vehicle 104 either by the owner of the first vehicle 104 or the manufacturer of the first vehicle 104. In some embodiments, the first user device 210 and the first in-car device 212 may be used interchangeably.

The parking space detector 202a determines an availability of a parking space. In one embodiment, the parking space detector 202a is an object detector using infrared detection method. Other methods such as magnetic detection or image detection may also be used according to specific conditions, and the present application is not limited thereto.

RFID reader 204a obtain an RFID associated with the first vehicle 104 and a first user device 210 in response to determining, by the parking space detector 202a, that the parking space is occupied. In some embodiments, the RFID reader 204a obtains the RFID associated with the first vehicle 104 and the first user device 210 by sending interrogating radio waves to the RFID tag 208 and receiving digital data transmitted by the RFID tag 208. The digital data includes the RFID associated with the vehicle. RFID contains a sequence of numbers and/or letters that identifies an RFID tag 208 installed inside the first vehicle 104. In some embodiments, RFID may be derived from the digital data transmitted by the RFID tag 208.

Bluetooth antenna 206a is an input/output interface of the parking space terminal 102a that receives or transmits digital data from or to external or internal hardware, such as storage device 302, the first user device 210, the first in-car device 212, etc. In one embodiment, the Bluetooth antenna 206a receives the availability of the parking space from the parking space detector 202a and transmits the availability to the storage device 302, a first user device 210, or a first in-car device 212. The Bluetooth antenna 206a receives the RFID associated with the first vehicle 104 from the RFID reader 204a and transmits the RFID to the storage device 302. In another embodiment, the Bluetooth antenna 206a may be configured to measure a distance between itself and the first user device 210 or first in-car device 212 using a Bluetooth ranging technology. In one embodiment, the ranging technology measures the distance based on the strength of a Bluetooth signal sent by the first user device 210. In another embodiment, the ranging technology measures the distance based on a phrase of the Bluetooth signal sent by the first user device 210. The Bluetooth antenna 206a is configured to communicate with other Bluetooth antennae 206a of other parking space terminals, thereby forming a self-organizing Bluetooth network.

In some embodiments, the first user device 210 may be a device with Bluetooth connectivity such as a mobile phone, a hand-held device, a wearable device, a computer or a tablet, an augmented reality device, or other types of wireless devices. The first in-car device 212 may be an infotainment system of the vehicle. The infotainment system also has Bluetooth connectivity and performs communication, entertainment, and navigation functions of the vehicle.

In some embodiments, the RFID is associated with the first vehicle 104 and the first user device 210 through at least one piece of software run on the first user device 210 that allows the owner or operator of the first vehicle 104 to create associations among any combination of the RFID, the RFID tag 208, the first vehicle 104, and the first user device 210. For example, the manufacturer of the RFID tag 208 has a cellphone application that runs on the first user device 210. The cellphone application obtains the RFID associated with the RFID tag 208 and prompts the owner or operator of the first vehicle 104 to enter the various information of the first vehicle 104, including license plate number, VIN number, vehicle color, vehicle type, manufacturer, and/or model, etc., thereby associating the RFID with the first vehicle 104 and with the first user device 210. In another example, associations among any combination of RFID, the RFID tag 208, the first vehicle 104, and the first user device 210 are uploaded to a remote server via the first user device 210 connected to the Internet.

FIG. 3 illustrates an exemplary parking-management system in accordance with some embodiments. It is noted that the system of FIG. 3 is merely one example of a possible system, and embodiments may be implemented in any of various systems, as desired.

FIG. 3 shows a plurality of parking space terminals, ranging from parking space terminal 102a to parking space terminal 102c. Each of the plurality of parking space terminals comprises the same components as parking space terminal 102a. parking space terminal 102a comprises a parking space detector 202a, an RFID reader 204a, and a Bluetooth antenna 206a. The Bluetooth antennae in the plurality of parking space terminals form a self-organized network 306 such that each parking space terminal may communicate with one another via the self-organized network 306.

The Bluetooth antenna 206a is coupled to a storage device 302 via the self-organized network 306. In one embodiment, the Bluetooth antenna 206a receives the availability of the parking space from the parking space detector 202a and transmits the availability of a corresponding parking space to a storage device 302 via the self-organized network 306. In another embodiment, the Bluetooth antenna 206a receives the RFID associated with first vehicle 104 from the RFID reader 204a and transmits the RFID to the storage device 302.

The storage device 302 may be coupled to a hardware processor 304. The hardware processor 304 may be configured to process information stored in the storage device 302. In one embodiment, the hardware processor 304 generates an association between the parking space ID 0001 and the RFID of the first vehicle 104. The association may be stored in storage device 302. Availability corresponding to parking space ID is also updated.

The self-organized network 306 may be operably coupled to the first user device 210 such that the first user device 210 can have data exchanges between the parking space terminal 102a. In one embodiment, the hardware processor 304 causes the storage device 302 to send to the first user device 210 the parking space ID of a parking space at which the first vehicle 104 is currently park via self-organized network 306.

In one embodiment, the Bluetooth antenna 206a is configured to measure and transmits a distance between the Bluetooth antenna 206a and the first user device 210 to the self-organized network 306. The hardware processor 304 then determines the location of the first user device 210 or the first in-car device 212 based on the distances calculated and sent by the plurality of Bluetooth antennae.

FIG. 4 illustrates an exemplary data structure used by storage device 302 of the parking management system in accordance some embodiments. The storage device 302 may store information of the plurality of parking spaces by maintaining a relational database or other type of database or file. In one embodiment, the database comprises rows corresponding to information pertaining each of the plurality of parking spaces and columns corresponding to information types. In one embodiment, the columns of the relational database comprises data types including parking space ID, RFID, availability, and characteristic of the parking space. A cell of the database represents the data or information of a particular data type pertaining a specific parking space. In one embodiment, when a cell does not have any available information or applicable data, a label (e.g., "null") may be included to indicate that there is no available information or applicable data. For example, if the availability of parking space 0011 is vacant, a "null" is stored in the cell corresponding to the RFID of parking space 0011 in the database.

As shown in FIG. 4, column 402 comprises parking space IDs corresponding to the plurality of parking spaces. In one embodiment, column 402 includes the parking space IDs of all of or part of the plurality of parking spaces in the parking lot such that each row includes information corresponding to the parking space with that parking space ID. In the embodiment illustrated in FIG. 4, there are 12 parking spaces with parking space IDs ranging from 0001 to 0012, and column 402 includes 0001, 0002, . . . , and 0012.

Column 404 comprises RFIDs associated with the vehicles parked in the plurality of parking spaces. In the embodiment illustrated in FIG. 4, two cars are parked, respectively, in parking spaces 0001 and 0002, and the RFIDs of the two cars are included in Column 404; in other parking spaces (e.g., 0003, 0007), "null" is included in their row to indicate that there is no car presently parked there.

Column 406 comprises the availability of each of the plurality of parking spaces (e.g., occupied, vacant, reserved).

Column 408 comprises characteristic(s) of each of the plurality of parking spaces. In some embodiments, the characteristic of a parking space may be described by word(s), number(s), label(s), location information, or any combination thereof that distinguish the parking space from other parking spaces. In one embodiment, the characteristic of a parking space may be near-entrance, near-elevator, near-mall entrance, spacious, or any combination thereof.

Figure 5:
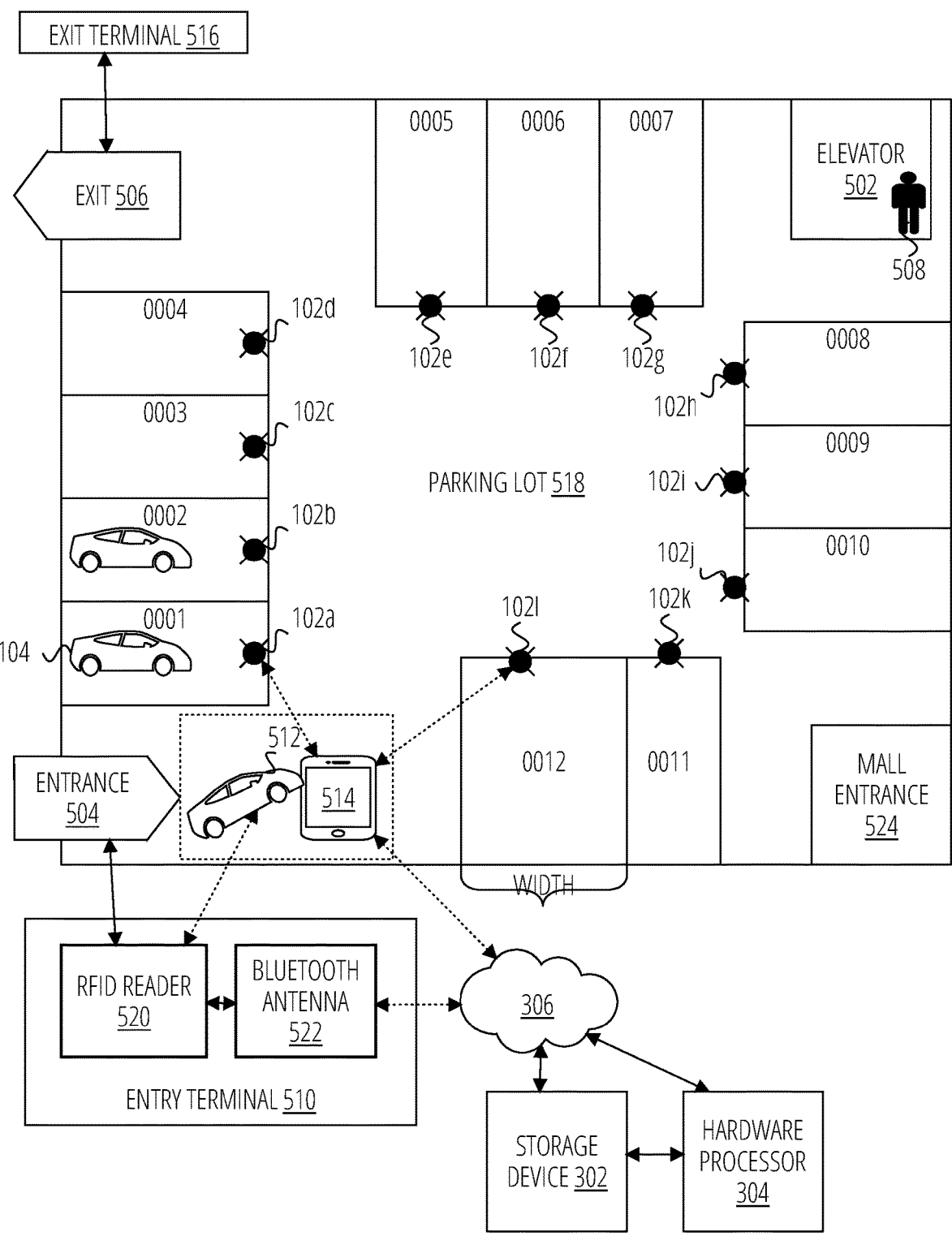
FIG. 5 illustrates a parking-management system implemented in a parking lot in accordance with some embodiments.

FIG. 5 illustrates a parking-management system implemented in a parking lot in accordance with some embodiments.

As shown in FIG. 5, the system comprises the self-organized network 306, storage device 302, and the hardware processor 304 shown in FIG. 3. FIG. 5 also illustrates that the system may further comprise a plurality of parking space terminals 102, including parking space terminal 102a, parking space terminal 102b, . . . , and parking space terminal 1021, each of which corresponds to a corresponding parking space in the parking lot. For example, parking space terminal 102a corresponds to parking space 0001 and parking space terminal 102b corresponds to parking space 0002. The availabilities of parking spaces 0001 and 0002 are occupied, and availabilities of parking spaces 0003-0012 are vacant. The parking lot includes an entrance 504, an exit 506, an Elevator 502, and a mall entrance 524.

FIG. 5 also illustrates that the system may further comprise an entry terminal 510 installed at the entrance 504. In some embodiments, the entry terminal 510 may comprise an RFID reader 520 and a Bluetooth antenna 522. The RFID reader 520 may be substantially the same as RFID reader 204a, and Bluetooth antenna 522 may be substantially the same as Bluetooth antenna 206a. The entry terminal 510 may be in communication with the storage device 302 and hardware processor 304 via the Bluetooth antenna 206a and the self-organized network 306.

In some embodiments, the entry terminal 510 may be configured to obtain, by an RFID reader 520, a second RFID of a second vehicle 512 in response to the second vehicle 512 entering the parking lot 518 through the entrance 504. In some embodiments, the RFID reader 520 obtains the second RFID in substantially the same way that parking space detector 202a obtains the RFID associated with the first vehicle (see detailed description with reference to FIG. 2). In response to reading the second RFID of the vehicle, the hardware processor may be configured to cause the system to perform a variety of different operations. For example, to start timing the duration of the vehicle being within the premise of the parking lot to calculate parking fees.

In some embodiments, as shown in FIG. 5, in response to reading the second RFID of the second vehicle 512 by the RFID reader 520 of the entry terminals 510, the hardware processor 304 causes the system to provide a second user device 514, via the self-organized network 306, with navigation instructions to a vacant parking space, wherein the vacant parking space being one of the plurality of parking spaces.

In some embodiments, to provide the second user device 514 with user device navigation instructions to a vacant parking space, the system may select a preferred parking space based on the availabilities of parking spaces and a user preference. In one example, the system selects parking space 0003 as the preferred parking space because it is vacant and the user 508 does not provide the user preference.

In some embodiments, the user preference may be a characteristic of the parking space. For example, the user preference may be the following characteristics associated with the parking space: being near entrance, being near-mall-entrance, being near exit, being near elevator, or being spacious. In some embodiments, the characteristics are pre-defined in the storage device 302. For examples, characteristics of parking spaces 0001 and parking spaces 0012 are predefined as near-entrance based on the distances between the entrance 504 and parking spaces 0001 and 0012 are shorter than those of other parking spaces; characteristics of parking spaces 0004 and 0005 are predefined as near-exit based on the distances between the exit 506 and parking spaces 0004 and 0005 are shorter than those of other parking spaces; characteristics of parking spaces 0007 and 0008 are predefined as near-elevator based on the distances between the elevator 502 and parking spaces 0007 and 0008 are shorter than those of other parking spaces; and characteristic of parking space 0012 is predefined as spacious based on a width of parking space 0012 is wider than those of the other parking spaces in the parking lot. Similarly, the characteristics of parking spaces 0010 and 0011 are predefined as near-mall-entrance because they are closer to the mall entrance 524 than other parking spaces (See FIG. 4).

In some embodiments, the system may further comprise an exit terminal 516 installed at the exit 506 of the parking lot. The exit terminal 516 may be configured to work in substantially the way as the entry terminal 510, that is, as a vehicle in response to the vehicle passing through either an entry or exit, the RFID reader 204a of the exit terminal 516 reads the RFID of the vehicle. In response to reading the RFID of the vehicle, the hardware processor may be configured to cause the system to perform a variety of different steps; for example, to stop timing the duration of the vehicle being within the premise of the parking lot to calculate parking fees.

FIGS. 6A-6C include flowcharts representing a method 600 for parking-management in accordance with some embodiments. Method 600 may be governed by instructions that are stored in a non-transitory computer-readable storage medium and that are executed by one or more hardware processors, such as in the parking-management system illustrated in FIGS. 1-3. Each of the operations shown in FIGS. 6A-6C may correspond to instructions stored in a computer memory or computer readable storage medium. The computer readable storage medium may include a magnetic or optical disk storage device, solid state storage devices such as Flash memory, or other non-volatile memory device or devices (for example, storage device 302 of parking management system). The computer readable instructions stored on the computer readable storage medium may include one or more of: source code, assembly language code, object code, or other instruction format that is executed or interpreted by one or more hard processors. Some operations in method 600 may be combined and/or the order of some operations may be changed.

In operation 602, a parking space detector 202a determines a first availability of a first parking space. In some embodiments, the first parking space may be any one of the plurality of parking spaces (e.g., parking space 0001-0012 in FIG. 5) of a parking lot (e.g., parking lot 518 in FIG. 5). The first availability is referring to the availability of the first parking space. The method for determining the availability of a parking space by a parking space detector is described with reference to FIG. 2. In one embodiment, the parking space detector used to determine the first availability is substantially the same as parking space detector 202a.

In operation 604, a RFID reader obtains a first RFID associated with a first vehicle and a first user device in response to determining that the first parking space being occupied by the first vehicle. In one embodiment, a first vehicle may be a vehicle presently occupying the first parking space. The first RFID is the RFID of the first vehicle. The method for obtaining the RFID associated with the first vehicle and the first user device is described with reference to FIG. 2.

In operation 606, the parking space detector 202a re-determines the first availability of the first parking space within a pre-specified length of time to confirm that the first parking space is still being occupied by a first vehicle. In some embodiments, in response to determining that the availability of a parking space is occupied in operation 602, the parking space detector 202a re-determines the first availability of the first parking space. In some embodiments, the re-determination is performed in substantially the same as the determination performed in operation 602. In some embodiments, operation 604 is performed again in response to re-determining that the first parking space is still occupied to verify that the first parking space is occupied by the first vehicle 104. In some embodiments, the first availability of the first parking space is vacant if a vehicle only temporarily enters the first parking space, uses the first parking space to maneuver around the parking lot, and leaves a premise of the first parking space after a pre-specified length of time. In some embodiments, the pre-specified length of time may range from 1-5 minute(s).

In operation 608, a hardware processor (e.g., hardware processor 304 in FIG. 3) communicates the first RFID and the first parking space ID to a storage device (e.g., storage device 302 in FIG. 3) via a self-organized network (e.g., self-organized network 306 in FIG. 3). In some embodiments, in response to receiving the first RFID and the first parking space ID, the storage device stores the first RFID and the first parking space ID in the same row of a database maintained by the storage device, thereby creating an association between the first RFID and the first parking space ID (see the row pertaining parking space 0001 in FIG. 4). Since the first RFID is also associated the first user device, a three-way association among the first RFID, the first parking space ID, and the first user device 210/first first in-car device 212 is formed. The method 600 continues through either a connector A 630 or a connector B 632.

FIG. 6B continues to illustrate method 600, starting from the connector A 630.

In operation 612, obtain a second RFID associated with a second vehicle in response to determining that the second vehicle having entered a parking lot. In some embodiments, the operation for obtaining the second RFID associated with the second vehicle is described with reference to FIG. 5.

In operation 614, provide a second user device with navigation instructions to a vacant parking space, wherein the vacant parking space being one of the plurality of parking spaces. In one embodiment, the second user device 514 may be the same type of device as the first user device 210. In another embodiment, the second user device 514 may be the same type of device as the first in-car device 212.

In operation 616, generate a find-parking route starting from a starting location of the second user device 514 to the vacant parking space. In some embodiments, the vacant parking space may be a preferred parking space selected based on the user preference. In some embodiments, the hardware processor 304 generates a find-parking route using a variety of route-planning algorithms. In one embodiment, the starting location of the second user device 514 may be the location of the entrance 504. In one embodiment, the starting location may be identified by the hardware processor 304 based on locations of the at least two parking space terminals and the distances between each of the at least two parking space terminals and the second user device 514.

In operation 618, identify locations of the second user device as the second user device 514 moves based on the distances among the second user device and at least two parking space terminals having Bluetooth antennae. In some embodiments, a hardware processor may identify locations of the second user device based on locations of the at least two parking space terminals and the distances between each of the at least two parking space terminals and the second user device 514. The way Bluetooth antennae of the parking space terminal measure distances is discussed with reference to FIG. 2. In some embodiments, operation 618 is performed continuously as the second user device 514 moves around. In response to one of the at least parking space terminals gets out of range from the second user device 514, nearby parking space terminals continues to measure distances between itself and the second user device 514 and to transmit the distances measured via the self-organized network.

In operation 620, provide the second user device with turn-by-turn navigation instructions based on the find-parking route and the identified locations of the second user device. In some embodiments, the find-parking route may include multiple maneuvers, changes of directions for the second vehicle 512 to perform in order to go from its current location to the destination (e.g., a vacant parking space). The turn-by-turn navigation instructions may be instructions to drive toward a certain direction at an intersection. The instructions may be viewable on an user-interface of the second user devices 514. The instructions may be to perform a left, right, or U turn at each intersection.

FIG. 6C continues to illustrate method 600, starting from the connector B 632. In operation 622, identify the first parking space based on an association between the first RFID and the first parking space ID. In some embodiments, the association is established in the storage device 302. A three-way association among the first RFID, the first parking space ID, and the first user device 210 is created as described with reference to FIG. 2. The hardware processor may identify where the first vehicle 104 is parked based on the association. In some embodiments, the first user device 210 may display, on its user interface, various information of the parking space.

In operation 624, generate a find-car route starting from the first user-device to the first parking space. In some embodiments, the hardware processor 304 generates a find-car route using a variety of route-planning algorithms. In one embodiment, the starting location of the first user device 210 may be the location of the elevator 502. In another embodiment, the starting location may be identified by the hardware processor 304 based on locations of the at least two parking space terminals and the distances between each of the at least two parking space terminals and the first user device 210.

In operation 626, identify locations of the first user device based on the distances among the first user device and at least two parking space terminals. In some embodiments, locations of the first user device is determined by based on the distances among the first user device 210 and at least two parking space terminals having Bluetooth antennae. In some embodiments, a hardware processor may identify locations of the first user device 210 based on locations of the at least two parking space terminals and the distances between each of the at least two parking space terminals and the first user device 210. The way Bluetooth antennae of the parking space terminal measure distances is discussed with reference to FIG. 2. In some embodiments, operation 626 is performed continuously as the first user device 210 moves around. In response to one of the at least parking space terminals gets out of range from the first user device 210, nearby parking space terminals continues to measure distances between itself and the first user device 210 and to transmit the distances measured via the self-organized network.

In operation 628, provide the first user device with turn-by-turn navigation instructions based on the find-car route and the locations of the first user device. In some embodiments, the find-car route may include multiple maneuvers, changes of directions for a person (e.g., an owner/operator of the first vehicle 104) to perform in order to go from his or her current location to the destination (e.g., the first vehicle 104). The turn-by-turn navigation instructions may be instructions to walk toward a certain direction at an intersection. The instructions may be viewable on an user-interface of the first user device 210. The instructions may be to turn left, right, or around at each intersection.

Figure 7:
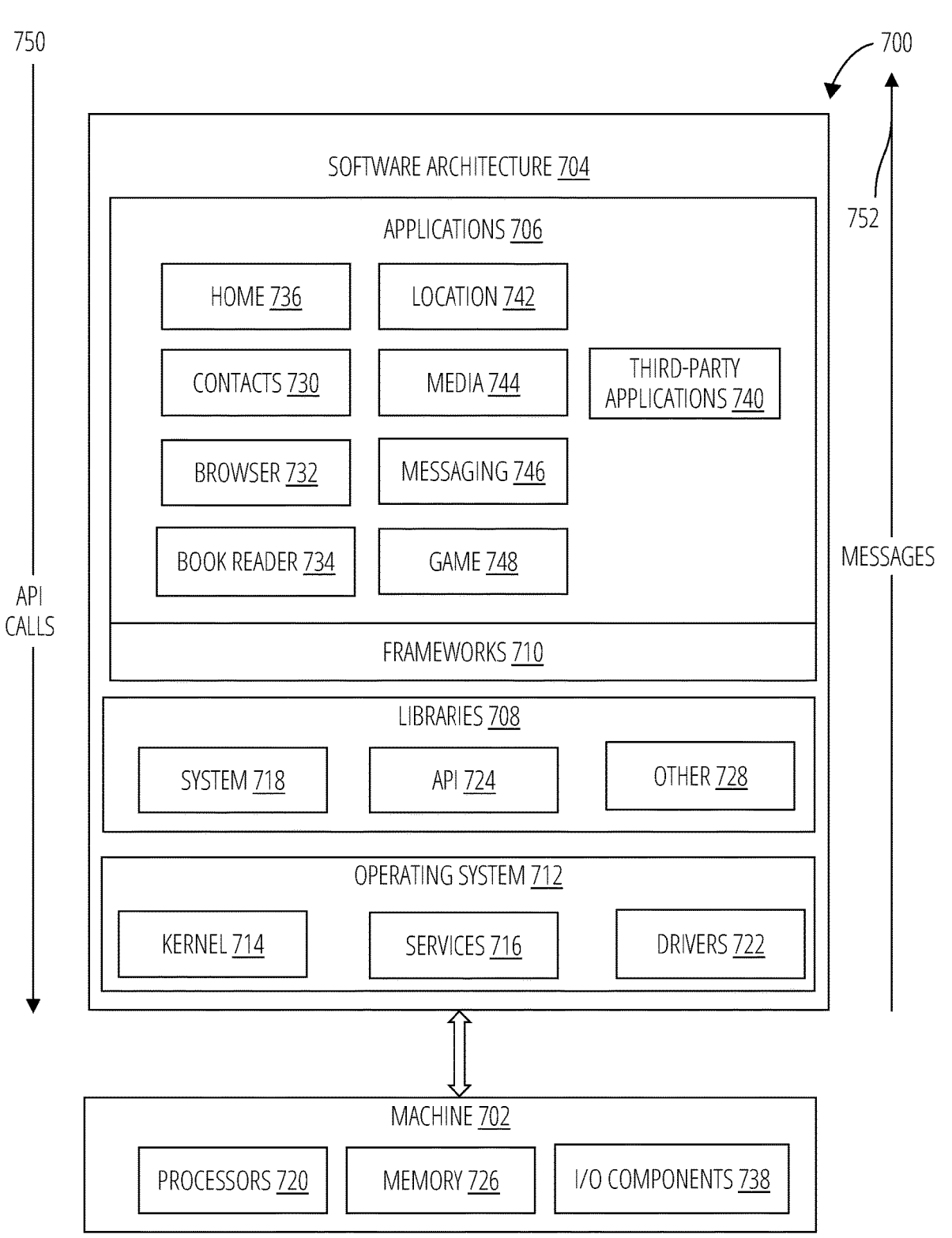
FIG. 7 is a block diagram illustrating a software architecture, which can be installed on any one or more of the devices described herein.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where individual layers provide a particular functionality. The software architecture 704 includes layers such as an operating system 712, libraries 708, frameworks 710, and Applications 706. Operationally, the Applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the Applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the Applications 706.

The frameworks 710 provide a high-level common infrastructure that is used by the Applications 706. For example, the frameworks 710 provide various graphical user interface (GUI) functions, high-level resource management, and high-level location services. The frameworks 710 can provide a broad spectrum of other APIs that can be used by the Applications 706, some of which may be specific to a particular operating system or platform.

In an example, the Applications 706 may include a home Application 736, a contacts Application 730, a browser Application 732, a book reader Application 734, a location Application 742, a media Application 744, a messaging Application 746, a game Application 748, and a broad assortment of other Applications such as third-party Applications 740. The Applications 706 are programs that execute functions defined in the programs. Various programming languages can be employed to create one or more of the Applications 706, structured in a variety of manners, such as object-oriented programming languages (e.g., Objective-C, Java, or C++) or procedural programming languages (e.g., C or assembly language). In a specific example, the third-party Applications 740 (e.g., Applications developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party Applications 740 can invoke the API calls 750 provided by the operating system 712 to facilitate functionality described herein.

It is to be understood that the present application is not limited to the specific arrangements and processes described above and shown in the figures. For the sake of brevity, detailed descriptions of known methods are omitted here. In the above-described embodiments, several specific steps are described and shown as examples. However, the method or process of the present application is not limited to the specific steps described, and those skilled in the art can make various changes, modifications, and additions, or change the sequence of steps after understanding the spirit of the present application.

It should also be noted that the exemplary embodiments mentioned in the present application describe some methods or systems based on a series of steps or devices. However, the present application is not limited to the order of the above steps, that is, the steps may be performed in the order mentioned in the embodiment or may be performed in an order different from the order in the embodiment, or several steps may be performed simultaneously.

In the present application, features described and/or illustrated with respect to one embodiment may be used in the same or similar manner in one or more other embodiments, and/or in combination with or in place of features of other embodiments.

In the present application, for the sake of brevity, devices, methods, or objects that are of the same kind or type are not described separately. For example, parking space terminal 102*a* is described in details, but parking space terminals 102*b*-1 work in substantially the same way. The first vehicle 104 and the second vehicle 512 are of the same type.

The following examples describe various embodiments of methods, machine-readable media, and systems (e.g., machines, devices, or other apparatus) discussed herein.

1. A method, comprising:
   determining a first availability of a first parking space, the first parking space having a first parking space ID, the first availability of the first parking spaces being either vacant or occupied, the first parking space being one of a plurality of parking spaces;
   obtaining a first radio-frequency ID (RFID) associated with a first vehicle and a first user device in response to determining that the first parking space being occupied by the first vehicle;

re-determining the first availability of the first parking space within a pre-specified length of time to confirm that the first parking space is still being occupied by the first vehicle; and
   communicating the first RFID and the first parking space ID to a storage device via a self-organized network formed by a plurality of parking space terminals.

2. The method of example 1, further comprising:
   obtaining a second RFID associated with a second vehicle in response to determining that the second vehicle having entered a parking lot; and
   providing a second user device with navigation instructions to a vacant parking space, wherein the vacant parking space being one of the plurality of parking spaces.

3. The method of any of the preceding examples, further comprising:
   selecting a preferred parking space based on availabilities of the plurality of parking spaces and a user preference.

4. The method of any of the preceding examples, wherein the user preference comprises at least one of following characteristics of the parking space: near-entrance, near-exit, near-elevator, and spacious.

5. The method of any of the preceding examples, wherein the providing the second user device navigation instructions to a vacant parking space comprises:
   generating a find-parking route starting from a starting location of the second user device to the vacant parking space;
   identifying locations of the second user device as the second user device moves based on at least two distances between the second user device and each of at least two parking space terminals; and
   providing the second user device with turn-by-turn navigation instructions based on the find-parking route and the identified locations of the second user device.

6. The method of any of the preceding examples, further comprising:
   identifying the first parking space based on an association between the first RFID and the first parking space ID;
   generating a find-car route starting from a starting location of the first user-device to the first parking space;
   identifying locations of the first user device as the first user device moves based on at least two distances between the first user device and each of at least two parking space terminals; and
   providing the first user device with turn-by-turn navigation instructions based on the find-car route and the identified locations of the first user device.

7. The method of any of the preceding examples, wherein the plurality of parking spaces are properties of different entities.

8. A system, comprising:
   a hardware processor;
   a parking space detector;
   an RFID reader;
   a Bluetooth antenna; and
   a storage device storing instructions that, when executed by the hardware processor, configure the system to:
   determine, by the parking space detector, a first availability of a first parking space, the first parking space having a first parking space ID, the first availability of the first parking spaces being either vacant or occupied, the first parking space being one of a plurality of parking spaces;

obtain, by the RFID reader, a first RFID associated with a first vehicle and a first user device in response to determining that the first parking space being occupied by the first vehicle;

re-determine, by the parking space detector, the first availability of the first parking space within a pre-specified length of time to confirm that the first parking space is still being occupied by the first vehicle; and communicate, by the hardware processor, the first RFID and the first parking space ID to a storage device via the Bluetooth antenna and a self-organized network formed by a plurality of parking space terminals.

9. The system of example 8, wherein the instructions further configure the system to: obtain, by an entry RFID reader, a second RFID associated with a second vehicle in response to determining that the second vehicle having entered a parking lot; and provide a second user device with navigation instructions to a vacant parking space, wherein the vacant parking space being one of the plurality of parking spaces.

10. The system of any of the preceding examples, wherein the instructions further configure the system to:

select, by the hardware processor, a preferred parking space based on the availabilities of the plurality of parking spaces and a user preference.

11. The system of any of the preceding examples, wherein the user preference comprises at least one of following characteristics of the vacant parking space: near-entrance, near-exit, near-elevator, and spacious.

12. The system of any of the preceding examples, wherein the provide a second user device with navigation instructions to a vacant parking space comprises:

generate a find-parking route starting from a starting location of the second user device to the vacant parking space;

identify locations of the second user device as the second user device moves based on at least two distances between the second user device and each of at least two parking space terminals; and provide the second user device with turn-by-turn navigation instructions based on the find-parking route and the identified locations of the second user device.

13. The system of any of the preceding examples, wherein the instructions further configure the system to:

identify the first parking space based on an association between the first RFID and the first parking space ID;

generate a find-car route starting from a starting location of the first user device to the first parking space;

identify locations of the first user device as the first user device moves based on at least two distances between the first user device and each of at least two parking space terminals; and provide the first user device with turn-by-turn navigation instructions based on the find-car route and the identified locations of the first user device.

14. The system of any of the preceding examples, wherein the plurality of parking spaces are properties of different entities.

15. A non-transitory computer-readable storage medium, the computer-readable storage medium including instructions that when executed by a computer, cause the computer to:

determine a first availability of a first parking space, the first parking space having a first parking space ID, the first availability of the first parking spaces being either vacant or occupied, the first parking space being one of a plurality of parking spaces;

obtain a first RFID associated with a first vehicle and a first user device in response to determining that the first parking space being occupied by the first vehicle;

re-determine the first availability of the first parking space within a pre-specified length of time to confirm that the first parking space is still being occupied by the first vehicle; and communicate the first RFID and the first parking space ID to a storage device via the Bluetooth antenna and a self-organized network formed by a plurality of parking space terminals.

16. The computer-readable storage medium of example 15, wherein the instructions further configure the computer to:

obtain, by an entry RFID reader, a second RFID associated with a second vehicle in response to determining that the second vehicle having entered a parking lot; and provide a second user device with navigation instructions to a vacant parking space, wherein the vacant parking space being one of the plurality of parking spaces.

17. The computer-readable storage medium of any of the preceding examples, wherein the instructions further configure the computer to:

select a preferred parking space based on availabilities of the plurality of parking spaces and a user preference.

18. The computer-readable storage medium of any of the preceding examples, wherein the user preference comprises at least one of following characteristics of the parking space: near-entrance, near-exit, near-elevator, near-mall-entrance, and spacious.

19. The computer-readable storage medium of any of the preceding examples, wherein the providing the second user device navigation instructions to a vacant parking space, comprising:

generate a find-parking route starting from a starting location of the second user device to the vacant parking space;

identify locations of the second user device as the second user device moves based on at least two distances between the second user device and each of at least two parking space terminals; and provide the second user device with turn-by-turn navigation instructions based on the find-parking route and the identified locations of the second user device.

20. The computer-readable storage medium of any of the preceding examples, wherein the instructions further configure the computer to:

identify the first parking space based on an association between the first RFID and the first parking space ID;

generate a find-car route starting from a starting location of the first user device to the first parking space;

identify locations of the first user device as the first user device moves based on at least two distances between the first user device and each of at least two parking space terminals; and provide the first user device with turn-by-turn navigation instructions based on the find-car route and the identified locations of the first user device.

The above descriptions are only embodiments of the present application and are not intended to limit the present application. For those skilled in the art, various modifications and changes may be made to the embodiments of the present application. Any modification, equivalent replacement, improvement, etc. made within the spirit and principle of the present application shall be included within the protection scope of the present application.

US 12,650,312 B2

15

What is claimed is:

1. A method, comprising:

determining a respective characteristic label for each of a plurality of parking spaces in a parking lot and storing the respective characteristic label in a database maintained by a storage device in association with a respective parking space ID of the parking space, wherein determining the respective characteristic label for a given parking space comprises:

determining a location of the given parking space;

determining a location of a reference parking space in the parking lot;

accessing a location of a parking space terminal, the parking space terminal being associated with an entrance of the parking lot, an exit of the parking lot, a mall entrance of the parking lot, or an elevator of the parking lot;

determining a distance between the location of the given parking space and the accessed location of the parking space terminal;

determining a distance between the location of the reference parking space and the accessed location of the parking space terminal; and in response to determining that the distance between the location of the given parking space and the accessed location of the parking space terminal is shorter than the distance between the location of the reference parking space and the location of the parking space terminal, assigning the respective characteristic label to the given parking space, the assigned respective characteristic label corresponding to the parking space terminal and comprising at least one of near-entrance, near-exit, near-elevator, or near-mall entrance;

determining that a first vehicle enters the parking lot;

in response to determining that the first vehicle enters the parking lot, accessing a parking preference of a user of the first vehicle, the parking preference including a characteristic of parking spaces, the characteristic of parking spaces comprising at least one of near-entrance, near-exit, near-elevator, near-mall entrance, or spacious;

determining at least one candidate parking space among the plurality of parking spaces in the parking lot, the at least one candidate parking space each having a stored characteristic label matching with the parking preference of the user, wherein determining the at least one candidate parking space comprises accessing the database maintained by the storage device to identify, among the plurality of parking spaces, at least one parking space whose stored characteristic label matches the parking preference of the user, as the at least one candidate parking space;

determining availability of the at least one determined candidate parking space;

selecting, among the at least one candidate parking space, a first parking space based on the availability of the at least one candidate parking space;

navigating the first vehicle to the first parking space;

determining, by sensing with an object detector, a presence of the first vehicle indicating a first availability of the first parking space, the first parking space having a first parking space ID, the first availability of the first parking space being either vacant or occupied, and the object detector being one of a plurality of object detectors in the parking lot, wherein the parking lot includes a structured layout with driving paths providing vehicular circulation between the plurality of parking spaces and wherein the plurality of object detectors in the parking lot are positioned only at the plurality of parking spaces;

obtaining a first radio-frequency ID (RFID) associated with the first vehicle and a first user device in response to determining that the first parking space being occupied by the first vehicle;

re-determining, by sensing with the object detector, the first vehicle indicating the first availability of the first parking space within a pre-specified length of time to confirm that the first parking space is still being occupied by the first vehicle, the object detector being one of the plurality of object detectors in the parking lot that are positioned only at the plurality of parking spaces; and communicating the first RFID and the first parking space ID to the storage device via a self-organized network formed by a plurality of parking space terminals, wherein the self-organized network is a self-organized network formed by antennae of the plurality of parking space terminals, and wherein each parking space terminal of the plurality of parking space terminals corresponds to a respective parking space of the plurality of parking spaces and comprises a respective object detector, a respective RFID reader, and a respective antenna.

2. The method of claim 1, wherein the navigating the first vehicle to the first parking space comprises:

generating a find-parking route starting from a starting location of the first user device to the vacant parking space;

identifying locations of the first user device as the first user device moves based on at least two distances between the first user device and each of at least two parking space terminals; and providing the first user device with turn-by-turn navigation instructions based on the find-parking route and the identified locations of the first user device.

3. The method of claim 1, further comprising:

identifying the first parking space based on an association between the first RFID and the first parking space ID;

generating a find-car route starting from a starting location of the first user device to the first parking space;

identifying locations of the first user device as the first user device moves based on at least two distances between the first user device and each of at least two parking space terminals; and providing the first user device with turn-by-turn navigation instructions based on the find-car route and the identified locations of the first user device.

4. The method of claim 1, wherein the plurality of parking spaces are properties of different entities.

5. The method of claim 1, wherein the determining the respective characteristic label of the given parking space comprises:

determining that a distance between the location of the entrance and the location of the given parking space is shorter than the distance between the location of the entrance and the location of the reference parking space; and in response to determining that the distance between the location of the entrance and the location of the given parking space is less than the distance between the location of the entrance and the location of the reference parking space, determining the respective characteristic label of the given parking space to be near-entrance.

6. The method of claim 1, wherein the determining the respective characteristic label of the given parking space comprises:

determining that a distance between the location of the exit and the location of the given parking space is shorter than the distance between the location of the exit and the location of the reference parking space; and in response to determining that the distance between the location of the exit and the location of the given parking space is less than the distance between the location of the exit and the location of the reference parking space, determining the respective characteristic label of the given parking space to be near-exit.

7. The method of claim 1, wherein the determining the respective characteristic label of the given parking space comprises:

determining that a distance between the location of the mall entrance and the location of the given parking space is shorter than the distance between the location of the mall entrance and the location of the reference parking space; and in response to determining that the distance between the location of the mall entrance and the location of the given parking space is less than the distance between the location of the mall entrance and the location of the reference parking space, determining the respective characteristic label of the given parking space to be near-mall entrance.

8. The method of claim 1, wherein the determining the respective characteristic label of the given parking space comprises:

determining that a distance between the location of the elevator and the location of the given parking space is shorter than the distance between the location of the elevator and the location of the reference parking space; and in response to determining that the distance between the location of the elevator and the location of the given parking space is less than the distance between the location of the elevator and the location of the reference parking space, determining the respective characteristic label of the given parking space to be near-elevator.

9. A system, comprising:

a hardware processor;

an object detector;

an RFID reader;

an antenna; and a storage device storing instructions that, when executed by the hardware processor, configure the system to:

determine a respective characteristic label for each of a plurality of parking spaces in a parking lot and store the respective characteristic label in a database maintained by the storage device in association with a respective parking space ID of the parking space, wherein determining the respective characteristic label for a given parking space comprises:

determining a location of the given parking space;

determining a location of a reference parking space in the parking lot;

accessing a location of a parking space terminal, the parking space terminal being associated with an entrance of the parking lot, an exit of the parking lot, a mall entrance of the parking lot, or an elevator of the parking lot;

determining a distance between the location of the given parking space and the accessed location of the parking space terminal;

determining a distance between the location of the reference parking space and the accessed location of the parking space terminal; and in response to determining that the distance between the location of the given parking space and the accessed location of the parking space terminal is shorter than the distance between the location of the reference parking space and the location of the parking space terminal, assigning the respective characteristic label to the given parking space, the assigned respective characteristic label corresponding to the parking space terminal and comprising at least one of near-entrance, near-exit, near-elevator, or near-mall entrance;

determine that a first vehicle enters the parking lot;

in response to determining that the first vehicle enters the parking lot, access a parking preference of a user of the first vehicle, the parking preference comprising a characteristic of parking spaces, the characteristic of parking spaces comprising at least one of near-entrance, near-exit, near-elevator, near-mall entrance, or spacious;

determine at least one candidate parking space among the plurality of parking spaces in the parking lot, the at least one candidate parking space each having a stored characteristic label matching with the parking preference of the user, wherein determining the at least one candidate parking space comprises accessing the database maintained by the storage device to identify, among the plurality of parking spaces, at least one parking space whose stored characteristic label matches the parking preference of the user, as the at least one candidate parking space;

determine availability of the at least one determined candidate parking space;

select, among the at least one candidate parking space, a first parking space based on the availability of the at least one candidate parking space;

navigate the first vehicle to the first parking space;

determine, by sensing with the object detector, a presence of first vehicle indicating a first availability of the first parking space, the first parking space having a first parking space ID, the first availability of the first parking spaces being either vacant or occupied, and the object detector being one of a plurality of object detectors in the parking lot, wherein the parking lot includes a structured layout with driving paths providing vehicular circulation between the plurality of parking spaces and wherein the plurality of object detectors in the parking lot are positioned only at the plurality of parking spaces;

obtain, by the RFID reader, a first RFID associated with the first vehicle and a first user device in response to determining that the first parking space being occupied by the first vehicle;

re-determine, by sensing with the object detector, the first vehicle indicating the first availability of the first parking space within a pre-specified length of time to confirm that the first parking space is still being occupied by the first vehicle, the object detector being one of the plurality of object detectors in the parking lot that are positioned only at the plurality of parking spaces; and communicate, by the hardware processor, the first RFID and the first parking space ID to the storage device via the antenna and a self-organized network formed by a plurality of parking space terminals, wherein the self-organized network is a self-organized network formed by antennae of the plurality of parking space terminals, and wherein each parking space terminal of the plurality of parking space terminals corresponds to a respective parking space of the plurality of parking spaces and comprises a respective object detector, a respective RFID reader, and a respective antenna.

10. The system of claim 9, wherein to navigate the first vehicle to the first parking space, the instructions configure the system to:

generate a find-parking route starting from a starting location of the first user device to the vacant parking space;

identify locations of the first user device as the first user device moves based on at least two distances between the first user device and each of at least two parking space terminals; and provide the first user device with turn-by-turn navigation instructions based on the find-parking route and the identified locations of the first user device.

11. The system of claim 9, wherein the instructions further configure the system to:

identify the first parking space based on an association between the first RFID and the first parking space ID;

generate a find-car route starting from a starting location of the first user device to the first parking space;

identify locations of the first user device as the first user device moves based on at least two distances between the first user device and each of at least two parking space terminals; and provide the first user device with turn-by-turn navigation instructions based on the find-car route and the identified locations of the first user device.

12. The system of claim 9, wherein the plurality of parking spaces are properties of different entities.

13. A non-transitory computer-readable storage medium, the computer-readable storage medium including instructions that when executed by a computer, cause the computer to:

determine a respective characteristic label for each of a plurality of parking spaces in a parking lot and store the respective characteristic label in a database maintained by a storage device in association with a respective parking space ID of the parking space, wherein determining the respective characteristic label for a given parking space comprises:

determining a location of the given parking space;

determining a location of a reference parking space in the parking lot;

accessing a location of a parking space terminal, the parking space terminal being associated with an entrance of the parking lot, an exit of the parking lot, a mall entrance of the parking lot, or an elevator of the parking lot;

determining a distance between the location of the given parking space and the accessed location of the parking space terminal;

determining a distance between the location of the reference parking space and the accessed location of the parking space terminal; and in response to determining that the distance between the location of the given parking space and the accessed location of the parking space terminal is shorter than the distance between the location of the reference parking space and the location of the parking space terminal, assigning the respective characteristic label to the given parking space, the assigned respective characteristic label corresponding to the parking space terminal and comprising at least one of near-entrance, near-exit, near-elevator, or near-mall entrance;

determine that a first vehicle enters the parking lot;

in response to determining that the first vehicle enters the parking lot, access a parking preference of a user of the first vehicle, the parking preference including a characteristic of parking spaces, the characteristic of parking spaces comprising at least one of near-entrance, near-exit, near-elevator, near-mall entrance, or spacious;

determine at least one candidate parking space among the plurality of parking spaces in the parking lot, the at least one candidate parking space each having a stored characteristic label matching with the parking preference of the user, wherein determining the at least one candidate parking space comprises accessing the database maintained by the storage device to identify, among the plurality of parking spaces, at least one parking space whose stored characteristic label matches the parking preference of the user, as the at least one candidate parking space;

determine availability of the at least one determined candidate parking space;

select, among the at least one candidate parking space, a first parking space based on the availability of the at least one candidate parking space;

navigate the first vehicle to the first parking space;

determine, by causing an object detector to sense a presence of the first vehicle, thereby indicating a first availability of the first parking space, the first parking space having a first parking space ID, the first availability of the first parking spaces being either vacant or occupied, and the object detector being one of a plurality of object detectors in the parking lot, wherein the parking lot includes a structured layout with driving paths providing vehicular circulation between the plurality of parking spaces and wherein the plurality of object detectors in the parking lot are positioned only at the plurality of parking spaces;

obtain a first RFID associated with the first vehicle and a first user device in response to determining that the first parking space being occupied by the first vehicle;

re-determine, by causing the object detector to sense the first vehicle, thereby indicating the first availability of the first parking space within a pre-specified length of time to confirm that the first parking space is still being occupied by the first vehicle, the object detector being one of the plurality of object detectors in the parking lot that are positioned only at the plurality of parking spaces; and communicate the first RFID and the first parking space ID to the storage device via an antenna and a self-organized network formed by a plurality of parking space terminals, wherein the self-organized network is a self-organized network formed by antennae of the plurality of parking space terminals, and wherein each parking space terminal of the plurality of parking space terminals corresponds to a respective parking space of the plurality of parking spaces and comprises a respective object detector, a respective RFID reader, and a respective antenna.

14. The computer-readable storage medium of claim 13, wherein to navigate the first vehicle to the first parking space, the instructions configure the computer to:

generate a find-parking route starting from a starting location of the first user device to the vacant parking space;

identify locations of the first user device as the first user device moves based on at least two distances between the first user device and each of at least two parking space terminals; and provide the first user device with turn-by-turn navigation instructions based on the find-parking route and the identified locations of the first user device.

15. The computer-readable storage medium of claim 13, wherein the instructions further configure the computer to:

identify the first parking space based on an association between the first RFID and the first parking space ID;

generate a find-car route starting from a starting location of the first user device to the first parking space;

identify locations of the first user device as the first user device moves based on at least two distances between the first user device and each of at least two parking space terminals; and provide the first user device with turn-by-turn navigation instructions based on the find-car route and the identified locations of the first user device.

\* \* \* \* \*